(12) United States Patent
Büllesbach et al.

(10) Patent No.: US 6,382,726 B2
(45) Date of Patent: May 7, 2002

(54) PIVOTALLY ADJUSTABLE MOTOR-VEHICLE ARMREST

(75) Inventors: Peter Büllesbach, Wermelskirchen; Ervin Jahic, Düsseldorf, both of (DE)

(73) Assignee: Grammer Automotive GmbH, Amberg (DE)

( * ) Notice: Subject to any disclaimer, the term of this patent is extended or adjusted under 35 U.S.C. 154(b) by 0 days.

(21) Appl. No.: 09/801,323

(22) Filed: Mar. 7, 2001

(30) Foreign Application Priority Data

Mar. 8, 2000 (DE) ........................................ 100 10 798

(51) Int. Cl.⁷ ................................................ B60N 2/46
(52) U.S. Cl. ............................... 297/411.38; 297/411.32
(58) Field of Search ........................ 297/411.2, 411.32, 297/411.35, 411.38

(56) References Cited

U.S. PATENT DOCUMENTS 5,702,157 A * 12/1997 Hurite
5,984,416 A * 11/1999 Waldo et al.
6,050,645 A * 4/2000 Bradbury

FOREIGN PATENT DOCUMENTS

EP 1 024 049 7/2000

* cited by examiner

Primary Examiner—Milton Nelson, Jr.
(74) Attorney, Agent, or Firm—Herbert Dubno; Andrew Wilford

(57) ABSTRACT

A motor-vehicle armrest has a guide strip with an inner end fixed on a pivot part and an outer end bearing elastically radially on the pivot part at an intermediate position passed by a latch-member pin before a body part pivoted on the pivot part reaches an upper end position. This guide is formed between its ends with a notch through which the pin can pass radially when the body part is generally in the lower position. It has between its ends a front surface engage able by the pin for outward deflection of the latch-member end as the intermediate position is passed and also has between its ends a back surface engage able by the pin to deflect the member out of radial engagement with the teeth on movement of the body part from the upper position back past the intermediate position toward the lower position.

16 Claims, 3 Drawing Sheets

PIVOTALLY ADJUSTABLE MOTOR-VEHICLE ARMREST

FIELD OF THE INVENTION

The present invention relates to a motor-vehicle armrest. More particularly this invention concerns such an armrest that can be pivoted between and set in different positions.

BACKGROUND OF THE INVENTION

A standard adjustable armrest as described in German utility model 299 01 887 has an elongated armrest extending radially from a pivot fixed on the motor-vehicle door or frame. This armrest is formed internally with an arcuate array of radially inwardly directed teeth engage able with the outer end of a pawl carried on the pivot and urged outward by a spring. The teeth and pawl end are angled such that the armrest can be pivoted with ratcheting of the pawl end along the row of teeth in a direction corresponding to raising of the armrest from a lowermost position.

The pawl carries a pin projecting parallel to the axis and sliding, as the armrest is raised, under two angularly offset guide springs or strips. When the armrest reaches the end of its upward travel, this pin passes the end of the second such strip, which drops down behind it so that when the armrest is pivoted back, the pin up rides on the back surfaces of the guide strips which keep the pawl end out of engagement with the teeth, permit- ting the armrest to be returned to its lowermost position. Once back in this lowermost position, the pin drops off the end of the first strip and the pawl end enters back into engagement with the internal teeth of the armrest.

The advantage of this system is that it is possible to dispense with a latching/unlatching button. Instead the armrest is freely movable upward and, if the desired position is passed, the user need merely pivot it all the way to its uppermost position, then back to its intermediate or lowermost position, whereupon upward ratcheting movement is again possible to find the desired position. The use of two guide strips makes it possible to swing the armrest only back halfway and then resume upward movement without having to go to the lowermost position.

The guide strips of this system bear on the entrainment pin of the pawl and influence its movement. Thus on upward adjustment there are two locations where movement is impeded as the pin passes the ends of these strips, and on downward movement there is also a certain jerkiness as they pin rides up the one strip, falls off its end, then rides up the other and falls off its end. All of this is therefore accompanied by different resistances to rotation of the armrest in different positions and makes the armrest click audibly as it is moved back down.

OBJECTS OF THE INVENTION

It is therefore an object of the present invention to provide an improved motor-vehicle armrest.

Another object is the provision of such an improved motor-vehicle armrest which overcomes the above-given disadvantages, that is which is of simple construction but which can be moved smoothly between its end positions.

SUMMARY OF THE INVENTION

A motor-vehicle armrest has according to the invention a pivot part defining a fixed axis, a body part pivotal about the axis on the pivot part, and stops on the parts for pivoting of the body part on the pivot part about the axis only between an upper end position and a lower end position. An arcuate array of angularly spaced teeth on one of the parts is engage able with an end of a latch member angularly fixed to and displaceable on the other of the parts. An entrainment pin projects axially from and is fixed to the latch member. A flexible guide strip has an inner end fixed on the one toothed part and an outer end bearing elastically radially on the one toothed part at an intermediate position passed by the pin before the body part reaches the upper end position and outwardly elastically deflectable by the pin as the intermediate position is passed. This guide is formed between its ends with a notch through which the pin can pass radially when the body part is generally in the lower position. It has between its ends a front surface engage able by the pin for outward deflection of the outer end as the intermediate position is passed and also has between its ends a back surface engage able by the pin to deflect the member out of radial engagement with the teeth on movement of the body part from the upper position back past the intermediate position toward the lower position. A spring braced between the other latch-carrying part and the latch member urges the member end into ratcheting engagement between the teeth on movement of the pivot part from the lower position toward the intermediate position and into engagement with the outer guide-strip surface on movement of the body part from the intermediate position back to the lower position.

Thus with this system a single guide strip is used and it only engages the latch-member pin on upward travel of the armrest immediately before it reaches its uppermost end position. At this point the outer arm is cammed momentarily out so that, when the arm is pivoted back down, the pin rides up on the back face of the guide strip so that the latch-member end is held out of engagement with the teeth. The inner end can be well offset and completely past the path of the pin so that the pin simply travels along a smoothly curved section of the guide strip.

The latch member moves in a straight line, typically radially, on the other latch-carrying part. More particularly the latch member is a bar of nonround section. The other latch-carrying part is formed with a radially extending guide slidably receiving the bar. This guide is shaped complementarily to the bar.

A compression spring is braced between the latch member and the other latch-carrying part. In addition the guide strip is a cast strip, preferably of plastic. It can actually be pivoted at an integral or separate hinge or pivot at its inner end on the one toothed part.

In accordance with the invention a spring urges the outer end of the guide strip radially against the one toothed part. This spring can be a separate part or the inherent springiness of the guide strip itself, for instance when it is made of spring steel. A cushion is provided on the one toothed part against which the spring outer end bears radially so that when it moves in and out no clicking is produced. The spring-steel guide strip is widened at its inner end for attachment to the one toothed part. In fact the one toothed part is formed adjacent the lower stop with an anchor to which the inner spring end is attached.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
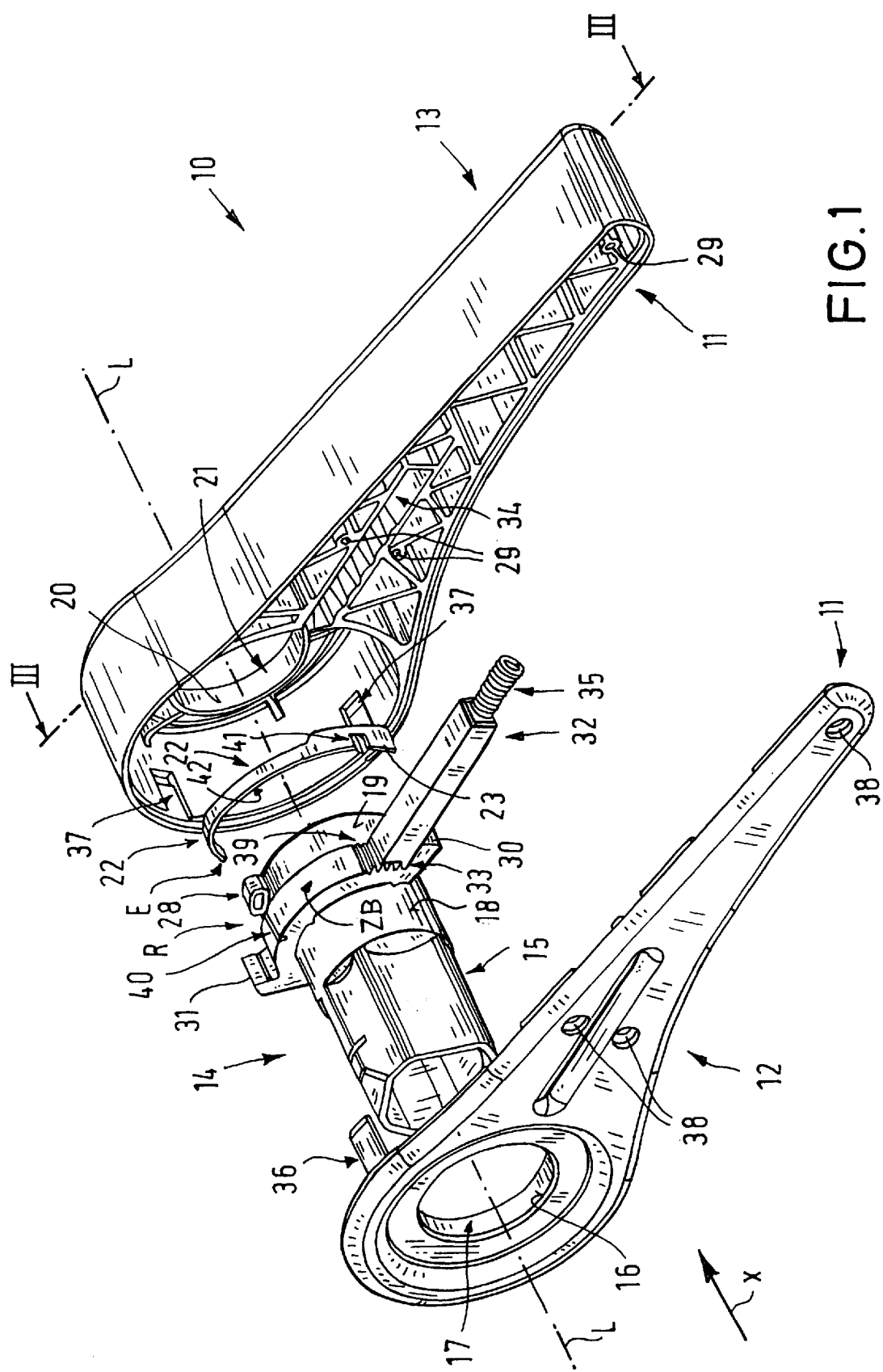
FIGS. 1 and 2 are exploded views of the adjustable armrest according to the invention.
Figure 2:
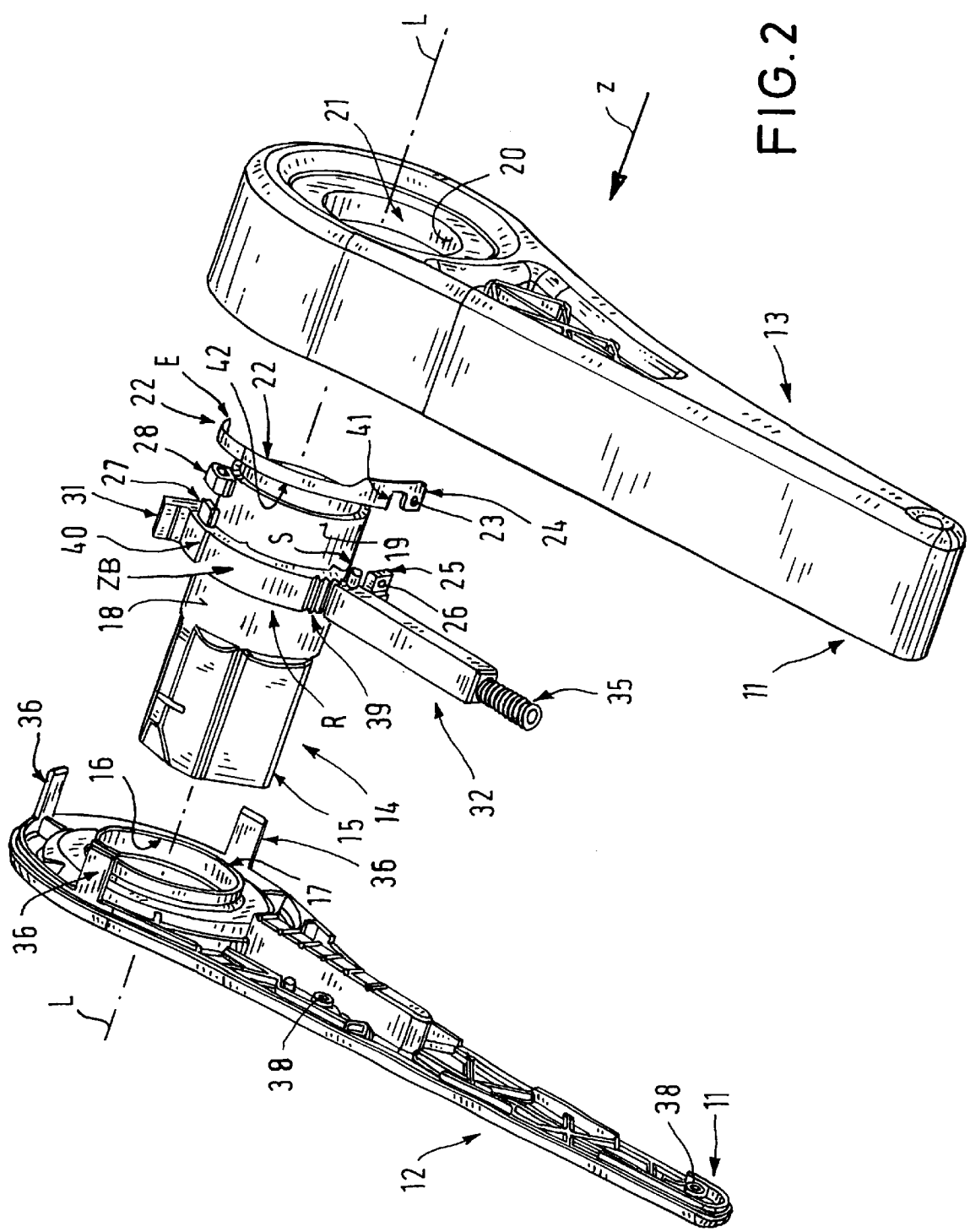

As seen in the drawing, an armrest 10 according to the invention has a body 11 formed of a pair of molded plastic parts 12 and 13 that are carried on a tubular metal pivot 14 having a polygonal-section portion 15 that is seated in the motor-vehicle door or other structure and cylindrical portions 18 and 19. The part 11 has a collar 17 with a cylindrical front surface 16 riding on the surface 18 and the part 13 a collar 21 with a cylindrical front surface 20 that rides on the surface 19 for pivoting of the body 11 about an axis L of the pivot 14. The part 11 further has snap tongues 36 engage able on movement of the parts 12 and 13 together as shown by arrows x and z in seats 37 in the part 13 to hold them together, and screws can be inserted through holes 38 in the part 12 into bores 29 in the part 13 to further lock the two parts 12 and 13 together. Normally the part 13 is covered with a cushioned layer matching the vehicle interior.

Between the surfaces 18 and 19 the pivot 14 is formed unitarily with a radially outwardly projecting ridge R formed at one end with a plurality of outwardly directed teeth 39 and a stop 30 and at the other end with a single notch 40 and, somewhat offset therefrom, another stop 31. A square-section latching dog or member 32 extending radially of the axis L has a tooth 33 engage able between the teeth 39 and in the notch 40 and is radially slidable in a guide slot 34 formed in the part 13, with a spring 35 urging it radially inward. A short pin S extends parallel to the axis L from a side face of the dog 32.

A guide member 22 formed of a strip of spring steel or a piece of molded plastic has one end 24 formed with a rivet hole 23 secured to a hole 26 in a rivet mount 25 fixed on the pivot 14 adjacent the stop 30 and an opposite end E that bears elastically radially inward on a cushion body 28 fitted over a mount 27 projecting axially from the ridge R at a location offset a short distance angularly from the upper end stop 31 toward the lower end stop 30. This guide 22 has an edge 42 directed axially toward the ridge R and formed adjacent its anchored end 24 with a notch 41 through which the pin S can pass radially when the dog 32 is adjacent the lower end stop 30. On upward movement as shown by arrow u the pin S therefore moves between an outer or back face ZB of the ridge R and an inner face JB of the guide spring 22.

According to the invention the tooth 33 is angled so that the armrest 10 can be pivoted up in direction u with ratcheting of the member 32 in the teeth 39. In this manner the angle of the armrest 10 can be adjusted at the lower end of its range of angular movement. Once the tooth 33 moves past the teeth 39, it rides on the ridge surface RB and eventually drops into the notch 40 to sit in a stable upright position.

Figure 3:
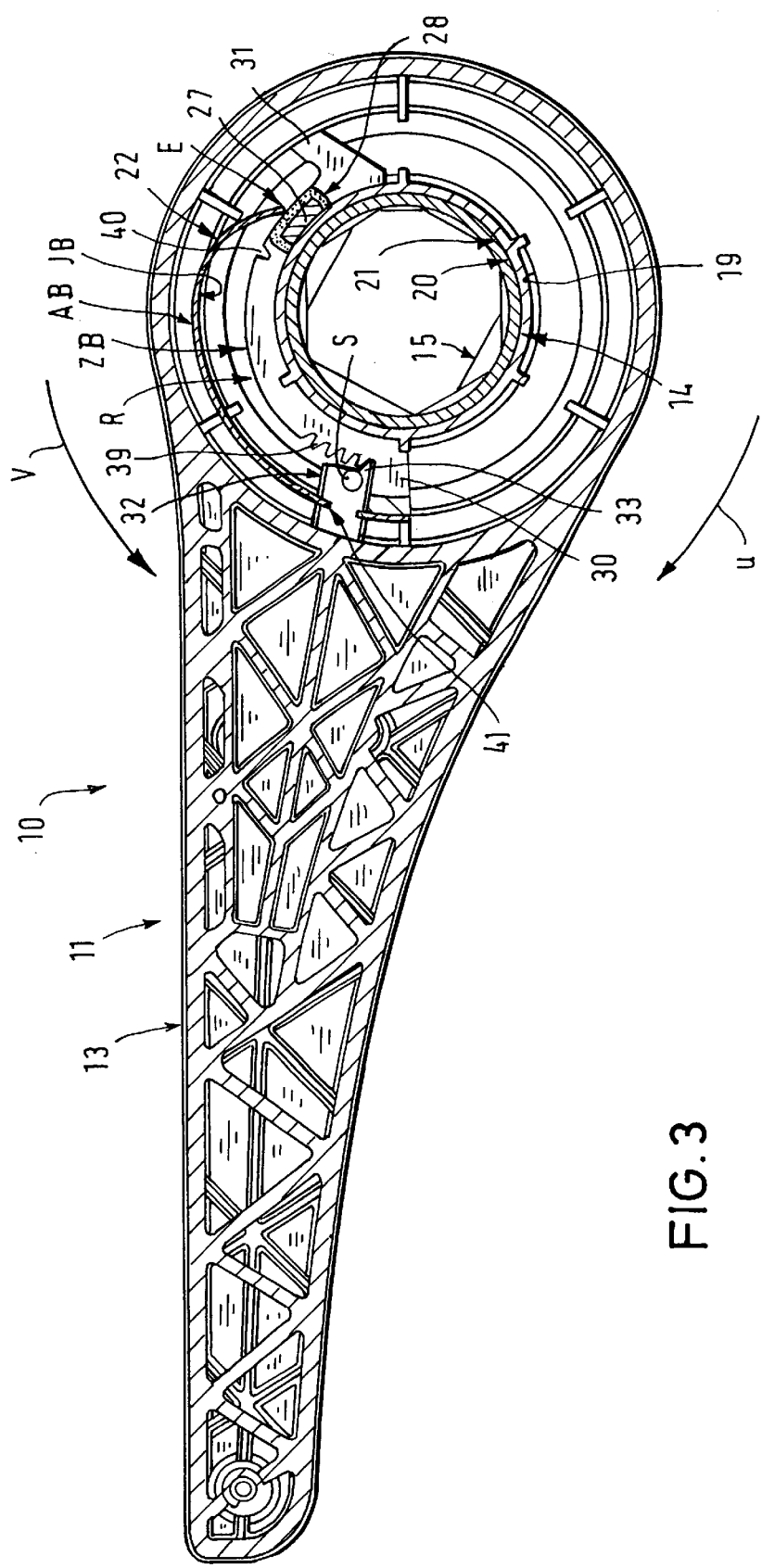
FIG. 3 is a section taken along line III—III of FIG. 1.

Further upward pivoting of the armrest 10 will push the pin S against the lower face JB of the guide 22 and cam its end E upward, allowing the pin S to pass out from underneath this guide 22, whereupon the end E will snap silently back down on the cushion 28. Reverse pivoting in the direction of arrow V will cause the pin S to ride up on an outer or back surface AB of the guide 22, compressing the spring 35 and holding the tooth 33 of the dog 32 out of engagement with the ridge R and with the teeth 39. This permits the armrest 10 to be pivoted back down until the pin S aligns with the notch 41 in the wide lower end of the guide 22, whereupon its spring 35 will push it inward into the position illustrated in FIG. 3, after which action further upward adjustment is possible.

We claim:

1. A motor-vehicle armrest comprising:

a pivot part defining a fixed axis;

a body part pivotal about the axis on the pivot part;

means including upper and lower stops on the parts for pivoting of the body part on the pivot part about the axis only between an upper end position and a lower end position;

an arcuate array of angularly spaced teeth on one of the parts;

a latch member angularly fixed to and displaceable on the other of the parts and having an end engage able radially with the teeth;

an entrainment pin projecting axially from and fixed to the latch member;

a flexible guide strip
having an inner end fixed on the one toothed part and an outer end bearing elastically radially on the one toothed part at an intermediate position passed by the pin before the body part reaches the upper end position and outwardly elastically deflectable flectable by the pin as the intermediate position is passed,
formed between its ends with a notch through which the pin can pass radially when the body part is generally in the lower position,
having between its ends a front surface engage able by the pin for outward deflection of the outer end as the intermediate position is passed,
having between its ends a back surface engage able by the pin to deflect the member out of radial engagement with the teeth on movement of the body part from the upper position back past the intermediate position toward the lower position; and spring means braced between the other latch-carrying part and the latch member and urging the member end into ratcheting engagement between the teeth on movement of the pivot part from the lower position toward the intermediate position and into engagement with the back guide-strip surface on movement of the body part from the intermediate position back to the lower position.

2. The motor-vehicle armrest defined in claim 1 wherein the latch member moves in a straight line on the other latch-carrying part.

3. The motor-vehicle armrest defined in claim 1 wherein the latch member moves radially on the other latch-carrying part.

4. The motor-vehicle armrest defined in claim 3 wherein the latch member is a bar.

5. The motor-vehicle armrest defined in claim 4 wherein the bar is of nonround section.

6. The motor-vehicle armrest defined in claim 5 wherein the other latch-carrying part is formed with a radially extending guide slidably receiving the bar.

7. The motor-vehicle armrest defined in claim 6 wherein the guide is shaped complementarily to the bar.

8. The motor-vehicle armrest defined in claim 1 wherein the spring means is a compression spring braced between the latch member and the other latch-carrying part.

9. The motor-vehicle armrest defined in claim 1 wherein the guide strip is a cast strip.

10. The motor-vehicle armrest defined in claim 9 wherein the strip pivots about its inner end on the one toothed part.

11. The motor-vehicle armrest defined in claim 9 wherein the strip is of plastic.

12. The motor-vehicle armrest defined in claim 1 further comprising spring means urging the outer end of the guide strip radially against the one toothed part.

13. The motor-vehicle armrest defined in claim 12, further comprising
   a cushion on the one toothed part against which the guide-strip outer end bears radially.

14. The motor-vehicle armrest defined in claim 13 wherein the guide strip is of spring steel and is inherently springy and is widened at the guide-strip inner end for attachment to the one toothed part.

15. The motor-vehicle armrest defined in claim 14 wherein the one toothed part is formed adjacent the lower stop with an anchor to which the guide-strip inner end is attached.

16. The motor-vehicle armrest defined in claim 1 wherein the one toothed part is the pivot part and the other latch-carrying part is the body part.

* * * * *